United States Patent [19]
Ygfors

[11] 3,717,921
[45] Feb. 27, 1973

[54] MANUFACTURE OF SCISSORS, TONGS, PLIERS OR THE LIKE CUTTING OR GRIPPING TOOLS

[75] Inventor: Güran Ygfors, Sollentuna, Sweden

[73] Assignee: Ygfors Trading AB, Jarfalla, Sweden

[22] Filed: Oct. 14, 1970

[21] Appl. No.: 80,730

[30] Foreign Application Priority Data

Oct. 17, 1969 Sweden .............................. 14266/69

[52] U.S. Cl. .......................... 29/407, 7/5.3, 29/412, 29/526, 30/341, 76/101, 81/300
[51] Int. Cl. ....B23q 17/00, B23p 17/00, B23p 19/00
[58] Field of Search........29/428, 505, 412, 407, 526; 76/101 R, 101; 81/300; 30/341; 7/5.3

[56] References Cited

UNITED STATES PATENTS 3,600,979   8/1971   Rozmus............................29/505

FOREIGN PATENTS OR APPLICATIONS 158,275   3/1957   Sweden................................29/458
551,585   6/1932   Germany..............................29/458

Primary Examiner—Thomas H. Eager
Attorney—Silverman & Cass

[57] ABSTRACT

An improved cutting or gripping implement manufactured by punching out a blank from sheet metal, the blank having a configuration of shanks, bending the blank into a shank structure, laminating the shanks, connecting them by a fastener, and providing plastic handles over the shanks.

16 Claims, 10 Drawing Figures

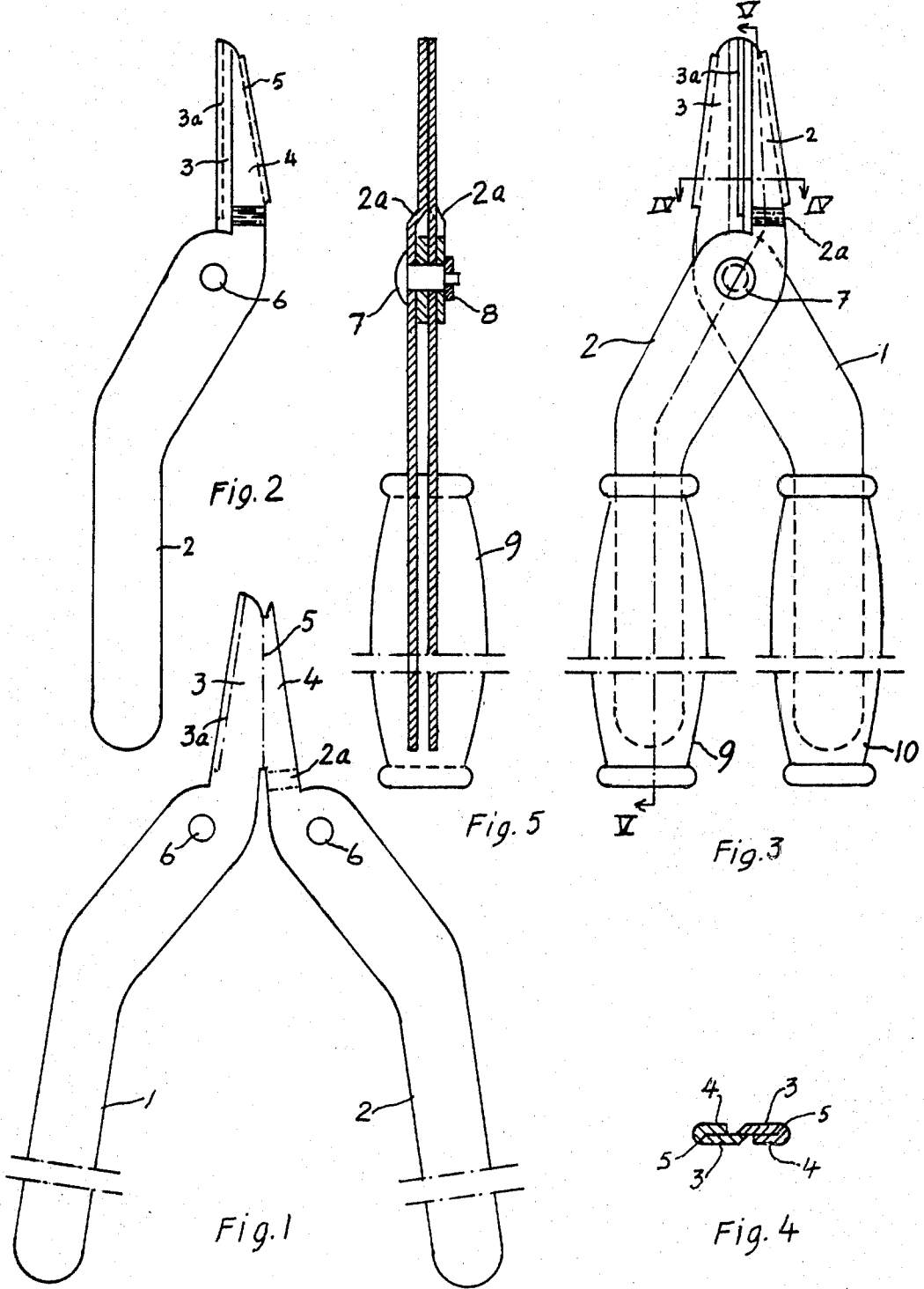

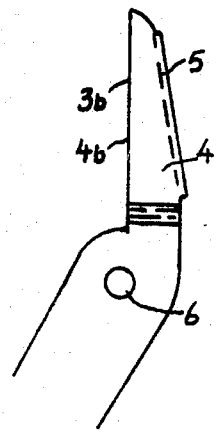
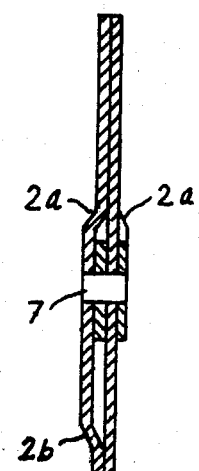
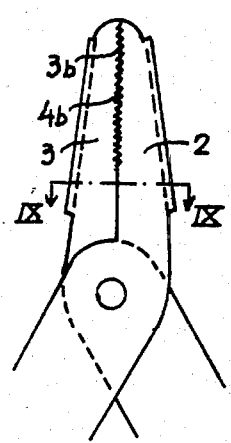
Fig. 7
Fig. 8
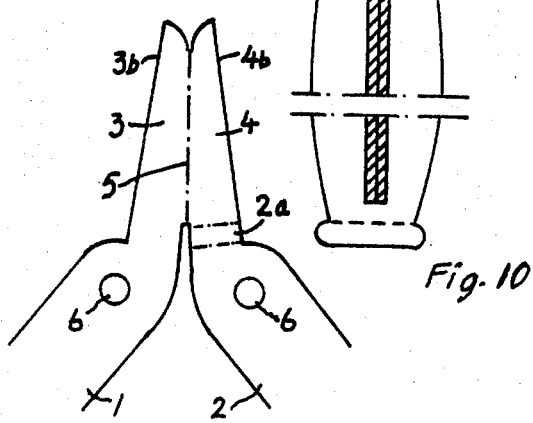
Fig. 10
Fig. 6
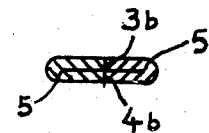
Fig. 9

MANUFACTURE OF SCISSORS, TONGS, PLIERS OR THE LIKE CUTTING OR GRIPPING TOOLS

BACKGROUND OF THE INVENTION

The present invention relates to improvements in the manufacture of scissors, tongs, pliers or the like cutting or gripping tools.

Such tools of conventional type consist of two legs or shanks which are articulated together in one point. Each shank is usually made from a blank by forging and grinding. The shanks are usually joined together by a rivet or a screw. Such a screw can be threaded in one of the shanks and run freely through the other, or it may run freely through both shanks and be provided with a nut to keep it in place. It is not possible to make the joint quite tight and, therefore, in the case of scissors, the blades have to be slightly bent towards each other for avoiding a gap between the edges.

In the case of a pair of tongs or pliers, one of the shanks is usually opened to form an eye which is big enough to allow the jaw of the other shank to be inserted therein, whereafter the eye has to be closed around the inserted shank by forging. Thereafter, the shanks are articulated to each other by a rivet. After the forging the jaws have to be hardened and ground.

It is also known to manufacture scissors, tongs and other cutting or gripping implements in which the blank for the shanks of such tools are punched out from sheet metal. It has been suggested to make each shank in the form of two blanks which are joined together along the shaft portions and to bend such blanks against each other. Thereafter, the different shank portions are interfoliated at the jaw portions thereof so that in the articulated joint four layers are obtained, each alternate layer belonging to one shank and the other layers belonging to the other. From the articulated joint two different parts protrude to form the jaw portion of each shank. These portions have to be bent against each other and joined to each other rigidly and usually they are welded together.

In this method of manufacturing, the bending and the welding of the jaw portions has proven difficult to carry out, and further the heat from the welding has been conducted to the joint and caused oxidation of the material in the joint so that the joint after cleansing has been untight. Therefore, the whole tool has proven to be rather unstable or a new tightening of the joint was made necessary. Further, the welding and the following cleansing and grinding are rather expensive operations and involve a considerable amount of manual work.

Accordingly it is an object of the present invention to provide a method of manufacturing scissors, tongs, pliers or the like cutting or gripping tools having two similar shanks which are articulated to each other, each shank having a jaw portion and a shaft portion, in which the method includes the steps of punching out from sheet metal one blank for each shank, each blank comprising two parts, each part having a shape that substantially corresponds to the shape of the shank, and one of said parts being a mirror image of the other, said two parts being connected to each other along a straight line which in the ready tool defines the back part of the jaw portion of each shank, bending each blank along said straight line so that said parts are brought to substantially lie against each other in the jaw portions thereof and shaping the parts in such a way that in the joint the two parts of each blank are separated such that the distance between them substantially corresponds to the metal sheet thickness, moving the bent shanks together with the shaft parts thereof towards one another and interfoliating the shanks with each other and thereafter connecting the shanks to each other by inserting a rivet or screw in the joint through a hole which extends through all four interfoliated parts of the two shanks

Summary of the Invention

An improved method of making cutting or gripping tools by pressing blanks of sheet metal in configuration of tool shanks, each shank comprising a jaw portion and a shaft portion, bending the blanks along a predetermined straight line, the straight line forming the back part of the jaw portion of the shank in the ready tool, interfoliating the shanks with one another and connecting them by a fastener in a bore extending through the shanks.

BRIEF DESCRIPTION OF THE DRAWINGS

FIG. 1 illustrates a punched out blank for a shank comprising two shank parts, said blank being in unfolded condition.

FIG. 2 illustrates the same blank as FIG. 1 which has been bent along a straight line, said line defining the back portion of the jaw of the ready shank.

FIG. 3 is a plane elevation of a pair of scissors or tongs or similar implement which is composed of two such shanks as illustrated in FIG. 2.

FIG. 4 is a section through the jaw portion of the device according to FIG. 3 along the line IV—IV as viewed in the direction of the arrows.

FIG. 5 is a section of the device according to FIG. 3 along the line V-V as viewed in the direction of the arrows.

FIG. 6 is a view corresponding to FIG. 1 but of another embodiment of the invention.

FIG. 7 illustrates a device according to FIG. 6 bent in a similar way as illustrated in FIG. 2.

FIG. 8 is a plane elevation of the upper part of a pair of tongs according to the embodiment illustrated in FIG. 6.

FIG. 9 illustrates a section of the device according to FIG. 8 along the line IX—IX as viewed in the direction of the arrows, and FIG. 10 is a section through the tool according to FIGS. 6–9 along the same sectional line which has been used for FIG. 5.

DESCRIPTION OF THE PREFERRED EMBODIMENTS

In FIG. 1, each of the reference numerals 1 and 2 illustrates a shaft portion of a shank part of a composed blank for a shank. Reference numerals 3 and 4 designate the jaw portion of said shank blank. Reference numeral 5 designates a dash-dotted line along which the parts 1,3 and 2,4 should be bent in relation to each other for forming a shank. Reference numeral 6 designates a bore in each of the shank parts which is intended to receive a rivet for keeping together the different parts of the tool. This bore may be provided in each part of the blank before it has been bent as illustrated in FIG. 1. Reference numeral 3a designates a dash-dotted line to which one of the jaw portions should be ground in order to form an edge.

The jaw portion of the shank is preferably tightly pressed so that its two parts 3 and 4 will lie close to each other. Before or during the pressing of the jaw portion the shaft parts 1 and 2 of the shank blank may be spaced apart from each other by bending one of the shank parts out in an area 2a so that two shank blanks may be interfoliated with each other in the joint and riveted together by inserting a rivet in the bores 6.

In FIG. 3 an assembled tool produced according to the invention is illustrated. The tool illustrated in FIG. 3 comprises two shank blanks of the kind illustrated in FIG. 1 and 2 which are identical with each other but turned in such a way that they form each other's mirror images, and which have been assembled with each other and kept together by a rivet or screw 7 inserted through the bores 6 in all four interfoliated parts of the blanks. In case of a screw 7 this may be a screw with a barrel under the head and be provided with a nut 8.

In FIG. 4 there is illustrated a section through the jaw portion of a tool according to FIG. 3. In the device according to FIG. 4 one of the jaw portions 4 in each shank blank is a little narrower than the other portion 3 so that said other portion 3 extends over the corresponding portion 3 of the other shank blank for forming the two jaws of a pair of cutting pliers, a pair of scissors or the like.

In FIGS. 6 to 10 there is illustrated a pair of flat nose pliers according to the present invention. In this embodiment the blank which should be bent to form a shank and which is illustrated in FIG. 6 is symmetrical about the bending line 5. The edges 3b and 4b respectively of the blank which are intended to form the jaw surfaces of the pair of pliers are left quite plane and need not be subjected to any grinding.

When the blank has been bent it is brought to the form illustrated in FIG. 7 and the edges 3b and 4b will be lying tightly together and in the same plane.

After the bending, the edges 3b and 4b are provided with transversal grooves in order to give the pliers better gripping characteristics on, for example, thin wires and the like.

Also in this case two shanks are made and interfoliated with each other in a similar way as has been described in connection with FIG. 3. When this interfoliation has been made the upper part of the pliers has the form illustrated in FIG. 8. In this Figure also the grooved edges 3b and 4b are illustrated.

In a pair of flat nose pliers of the type now described, the grooves of the two jaw surfaces which cooperate with each other should be displaced half a pitch so that a rib of one of the edges is opposite to a groove in the other grooved edge. In pair of pliers produced according to this invention this is easily achieved.

The bores 6 intended to receive the rivet or screw for the articulating joint of the tool are preferably punched out from the blank when said blank has the shape illustrated in FIGS. 1 and 6. After the interfoliation, the two shanks are pressed together in the way illustrated in FIG. 8, i.e. so that the grooved portions of the jaws will be brought to the best position in relation to each other. Thereafter, all bores 6 in the interfoliated blank parts are reamed. During this reaming the jaw portions are kept against each other so that the grooved edges 3b and 4b will not be brought out of the positions they have been brought to. After the reaming the screw or rivet 7 may be inserted in the way illustrated in FIGS. 3 and 5 and thereby the jaw portions will automatically be brought to correct positions in relation to each other.

According to a preferred embodiment of the invention the screw or rivet 7 may be replaced by a cylindrical pin which has neither head nor shoulder and the length of which is exactly equal to the total thickness of all interfoliated parts of the shank blanks. In order to make such a pin to stick the following method may be adopted: After the reaming of all the holes 6 in the shank blank parts interfoliated with each other said blanks are taken apart again. In one of the shanks the bores 6 are again reamed so that they will be some hundredth of a millimeter greater than the corresponding bores in the other shank blank. The diameter of the cylindrical pin which should form an axis is so chosen that it can be introduced by pressing in that shank blank which has not been reamed but is running freely in the shank blank which has been subject to reaming. When the shank blanks have been assembled again to the position illustrated in FIG. 8 the cylindrical pin is pressed through the holes 6 in the interfoliated parts and the pin will then be kept rigidly by such part where it is inserted with a force fit but be running freely in those parts where the bores have been subject to further reaming.

After that the shank blanks have been assembled in that way by means of the axis in the bores 6 one of the shaft parts 2 as illustrated in FIG. 10 may be bent in towards the other shaft part 1 of the same shank blank as illustrated by the reference numeral 2b whereby the shank blanks 1 and 2 will lie tightly together along the rest of the shaft parts.

It has proven that the jaw portions of a tool produced according to the present invention is sufficiently rigid without any welding or soldering together of the two parts of the shank blanks in the jaw portions.

Of course, other embodiments of the tool according to the invention may be produced than the so far described cutting pliers and the flat nose pliers.

After assembling of the shank parts the shaft parts of each shank may in a manner known per se be inserted in a handle 9,10 of melting plastic which before the insertion has been provided with channels of suitable size or grooves for receiving such shaft parts. Before the insertion, the shaft parts may be heated if required. In the embodiment according to FIGS. 1 to 5 two channels in each handle should be provided. In this case the handle serves as a connecting member between the two shaft parts of each shank. In the embodiment according to FIGS. 6 to 10 only one channel or groove in each handle part is required.

Other constructional details should be obvious from the drawings and, likewise, it is obvious that variations of a wide range may be made without departing from the spirit or scope of the invention as defined by the appended claims.

What is desired to secure by Letters Patent of the United States is:

1. A method for manufacturing scissors, tongs, pliers or the like cutting or gripping implements having two similar shanks which are articulated to each other, each shank having a jaw portion and a shaft portion, said method including the steps
  A. of punching out of sheet metal a blank for each shank, each blank comprising two parts, each part having a configuration substantially corresponding to the configuration of the shank, and one of said parts being a mirror image of the other,
  B. marking a straight line between said two parts in the jaw portion thereof,
  C. bending each blank along said straight line so that said parts are brought to substantially lie against each other in the jaw portion thereof,
  D. deflecting the parts such that in the joint, the two parts of each blank are separated so that the distance between them substantially corresponds to the thickness of the metal sheet,
  E. moving the bent shanks with the shaft parts thereof toward one another,
  F. interfoliating the shanks with each other, and
  G. inserting a fastener in the joint through a hole which extends through all four interfoliated parts of the two shanks, whereby the shanks are connected to one another.

2. A method according to claim 1, wherein the step of connecting the shanks to one another is performed by inserting a rivet through the bore.

3. A method according to claim 1, wherein the step of connecting the shanks to one another is performed by inserting a screw in the bore and securing it by a nut.

4. A method according to claim 1, wherein, subsequent to assembling the two shanks, the shaft parts of each blank are connected to each other by inserting said parts in a handle respectively.

5. A method according to claim 4, wherein each handle is moulded from plastic and provided with channels for the shaft parts, said shaft parts, subsequent to assembling the tool, being heated to a temperature above the softening temperature of the plastic and pressed into said channels.

6. A method according to claim 1, wherein subsequent to interfoliation the shaft parts of each shank are bent inwards towards each other so that they are lying tightly together and thereafter are inserted in one single channel in a plastic handle.

7. A method according to claim 1, wherein the bores in each shank for receiving the fastener are subjected together to a first reaming operation after the shanks have been interfoliated with each other and the jaw portions of the tool have been brought into proper position in relation to each other.

8. A method according to claim 7, wherein subsequent to the first reaming operation, the two shanks are disassembled, the bores in one of the shanks are subjected to a second reaming operation, the shanks are again interfoliated with each other and a pin is introduced in the bores of all the shanks, the pin having a diameter such that it may be inserted by force in the bores which were not subjected to said second reaming operation but is rotating freely in the bores which were subjected to said second reaming operation.

9. A method according to claim 1, wherein subsequent to assembling the tool, the parts of the shanks are hardened, and preferably also provided with surface hardening in the jaw portions and, including grinding of the jaw portions where necessary.

10. A method according to claim 1, wherein subsequent to bending each shank blank, the jaw portion of such blank is machined, boring of the shank blanks through all the interfoliated parts for forming the joint is performed, the blanks are disassembled again, the bore in one of the blanks is reamed, the blanks are interfoliated again, a pin is inserted by force in the bore and, where necessary, a new hardening, cleansing and grinding of the tool is carried out prior to inserting the shaft parts of the shanks in handles.

11. A gripping tool formed of sheet metal comprising:
  A. two shanks which are articulated to each other, each shank being a mirror image of the other, each shank having a jaw portion and a shaft portion, each shank comprising two parts, each part having a configuration substantially corresponding to the configuration of the shank,
  B. said parts constructed to substantially lie against each other in the jaw portion and connected to one another along a straight bend on one side of the jaw portion,
  C. said parts having a deflection at the lower end of the jaw portion such that they are separated so that the distance between them substantially corresponds to the thickness of the metal sheet,
  D. the shanks being interfoliated with each other,
  E. a fastener element disposed in a bore which extends through the shanks for fastening the shanks to one another, and
  F. a handle formed of plastic material having channels embracing said shaft portions.

12. A gripping tool according to claim 11, wherein the shaft portions of each shank are bent inwards towards each other so that they are lying tightly together being disposed in a channel in the plastic handle.

13. A gripping tool according to claim 11, wherein the fastener element comprises a pin having a diameter such that it may be inserted by force in the bore of one of the shanks but is freely rotatable in the bore of the other of the shanks.

14. A cutting tool formed of sheet metal comprising:
  A. two shanks which are articulated to each other, each shank being a mirror image of the other, each shank having a jaw portion and a shaft portion, each shank comprising two parts, each part having a configuration substantially corresponding to the configuration of the shank,
  B. said parts constructed to substantially lie against each other in the jaw portion and connected to one another along a straight bend on one side of the jaw portion,
  C. said parts having a deflection at the lower end of the jaw portion such that they are separated so that the distance between them substantially corresponds to the thickness of the metal sheet,
  D. the shanks being interfoliated with each other,
  E. a fastener element disposed in a bore which extends through the shanks for fastening the shanks to one another, and
  F. a handle formed of plastic material having channels embracing said shaft portions.

15. A cutting tool according to claim 14, wherein the shaft portions of each shank are bent inwards towards each other so that they are lying tightly together being disposed in a channel in the plastic handle.

16. A cutting tool according to claim 14, wherein the fastener element comprises a pin having a diameter such that it may be inserted by force in the bore of one of the shanks but is freely rotatable in the bore of the other of the shanks.

* * * * *